(12) United States Patent
Ohdo et al.

(10) Patent No.: US 8,646,789 B2
(45) Date of Patent: Feb. 11, 2014

(54) TORSION BEAM TYPE SUSPENSION DEVICE

(75) Inventors: Takaki Ohdo, Saitama (JP); Masafumi Mori, Saitama (JP); Takashi Okazaki, Tokyo (JP); Takumi Fujita, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/808,410

(22) PCT Filed: Jul. 20, 2011

(86) PCT No.: PCT/JP2011/066409
§ 371 (c)(1),
(2), (4) Date: Apr. 3, 2012

(87) PCT Pub. No.: WO2012/011482
PCT Pub. Date: Jan. 26, 2012

(65) Prior Publication Data
US 2013/0214504 A1    Aug. 22, 2013

(30) Foreign Application Priority Data

Jul. 23, 2010 (JP) ................................ 2010-165924
Jul. 23, 2010 (JP) ................................ 2010-165925
Jul. 23, 2010 (JP) ................................ 2010-165926

(51) Int. Cl.
*B60G 21/05* (2006.01)

(52) U.S. Cl.
USPC ................................................. 280/124.106

(58) Field of Classification Search
USPC ................ 280/124.106, 124.116, 124.128, 280/124.166
See application file for complete search history.

(56) References Cited

U.S. PATENT DOCUMENTS

| 4,432,564 A | * | 2/1984 | Tronville ............... 280/124.106 |
| 4,486,030 A | * | 12/1984 | Takata et al. ............ 280/124.107 |
| 5,409,254 A | | 4/1995 | Minor et al. |
| 5,909,888 A | | 6/1999 | Betz et al. |
| 6,047,978 A | * | 4/2000 | Watanabe et al. ...... 280/124.106 |

(Continued)

FOREIGN PATENT DOCUMENTS

| EP | 0 681 932 A2 | 11/1995 |
| EP | 1 338 447 A2 | 8/2003 |

(Continued)

*Primary Examiner* — Paul N Dickson
*Assistant Examiner* — Robert A Coker
(74) *Attorney, Agent, or Firm* — Carrier Blackman & Associates, P.C.; Joseph P. Carrier; William D. Blackman

(57) ABSTRACT

A torsion beam type suspension device is provided in which a trailing arm part and a torsion beam part are formed as a unit by press-forming a tailored blank material in which end parts of plate materials having different thicknesses are butt-welded via a weld part. A weld part of the tailored blank material comprises a U-shaped cross section in which front and rear side wall portions are connected via a bottom wall portion, and a pair of cutouts are formed at the edge of each of the side wall portions at positions sandwiching the weld part, and therefore, when the torsion beam part is twistedly deformed, shifting the concentration of stress from the weld part to the cutout enables peeling apart of the weld end part to be prevented and the durability of the torsion beam type suspension device to be enhanced.

8 Claims, 9 Drawing Sheets

(56) References Cited

U.S. PATENT DOCUMENTS

| | | | |
|---|---|---|---|
| 6,935,646 B2 * | 8/2005 | Inoue et al. | 280/124.106 |
| 7,284,765 B1 * | 10/2007 | Inoue et al. | 280/124.166 |
| 7,871,093 B2 * | 1/2011 | Ogawa et al. | 280/124.166 |
| 8,308,175 B2 * | 11/2012 | Choi et al. | 280/124.166 |
| 2004/0256828 A1 * | 12/2004 | Han et al. | 280/124.106 |
| 2005/0035567 A1 * | 2/2005 | Ok et al. | 280/124.107 |
| 2006/0131829 A1 * | 6/2006 | Alesso et al. | 280/124.166 |
| 2007/0246904 A1 * | 10/2007 | Murata et al. | 280/124.128 |
| 2007/0290474 A1 * | 12/2007 | Inoue et al. | 280/124.166 |

FOREIGN PATENT DOCUMENTS

| | | |
|---|---|---|
| JP | 8-127211 A | 5/1996 |
| JP | 2000-071022 A | 3/2000 |
| JP | 2006-281885 A | 10/2006 |
| JP | 2006-306211 A | 11/2006 |
| JP | 2010-208549 A | 9/2010 |

* cited by examiner

TORSION BEAM TYPE SUSPENSION DEVICE

TECHNICAL FIELD

The present invention relates to a torsion beam type suspension device that includes left and right trailing arm parts that extend in a fore-and-aft direction of a vehicle body, have front ends thereof vertically swingably pivoted on the vehicle body, and axially and rotatably support a wheel at a rear end thereof, and a torsion beam part that extends in a lateral direction of the vehicle body and has opposite ends thereof connected to the left and right trailing arm parts, the trailing arm part and the torsion beam part being formed as a unit by press-forming a tailored blank material in which end parts of plate materials having different thicknesses are butt-welded via a weld part.

BACKGROUND ART

An arrangement in which left and right trailing arm parts and a torsion beam part of a torsion beam type suspension device are formed from separate members, and side wall portions of the left and right trailing arm parts are superimposed on left and right opposite ends of the torsion beam part and welded to thus form a unit, is known from Patent Document 1 below.

Furthermore, forming a blank material, which is a material for a press-formed product, from a tailored blank material in which end parts of metal plates having different thicknesses are butt-welded is known from Patent Document 2 below.

RELATED ART DOCUMENTS

Patent Documents

Patent Document 1: Japanese Patent Application Laid-open No. 2006-281885
Patent Document 2: Japanese Patent Application Laid-open No. 2006-306211

DISCLOSURE OF INVENTION

Problems to be Solved by the Invention

In the torsion beam type suspension device described in Patent Document 1 above, since the trailing arm part and the torsion beam part are superimposed and welded, there is the problem that the weight increases in the superimposed section.

If a tailored blank material described in Patent Document 2 above were used for the torsion beam type suspension device, it would be possible to prevent any increase in weight, but there is the problem that when a vehicle is turning or traveling on a road in poor condition, stress is concentrated on the weld end part of the tailored blank material and peeling apart occurs, thereby causing a decrease in durability. In the invention described in Patent Document 2 above, concentration of stress on the weld part is alleviated by forming a notch on opposite side positions of the weld end part in the edge of the tailored blank material, but by so doing stress is now concentrated on the notch and cracking occurs, and there is a possibility that the durability of the torsion beam type suspension device will decrease.

The present invention has been achieved in light of the above-mentioned circumstances, and it is an object thereof to reliably prevent peeling apart of a weld end part of a torsion beam type suspension device that uses a tailored blank material.

Means for Solving the Problems

In order to attain the above object, according to a first aspect of the present invention, there is provided a torsion beam type suspension device comprising left and right trailing arm parts that extend in a fore-and-aft direction of a vehicle body, have front ends thereof vertically swingably pivoted on the vehicle body, and axially and rotatably support a wheel at a rear end thereof, and a torsion beam part that extends in a lateral direction of the vehicle body and has opposite ends thereof connected to the left and right trailing arm parts, the trailing arm parts and the torsion beam part being formed as a unit by press-forming a tailored blank material in which end parts of plate materials having different thicknesses are butt-welded via a weld part, characterized in that the weld part of the tailored blank material comprises a U-shaped cross section in which front and rear side wall portions extending in a substantially vertical direction are connected via a bottom wall portion, and a pair of cutouts are formed at the edge of at least one of the side wall portions at positions sandwiching the weld part.

Further, according to a second aspect of the present invention, in addition to the first aspect, the device comprises a flange that extends from a lower end of at least the one of the side wall portions in the vehicle body fore-and-aft direction, and the pair of cutouts are formed in the flange.

Furthermore, according to a third aspect of the present invention, in addition to the first or second aspect, the device comprises an upper member that forms the trailing arm part and the torsion beam part and a lower member that is welded to a lower face of the trailing arm part of the upper member to form a closed cross section, and an inner end in the vehicle width direction of the lower member extends to the positions of the pair of cutouts.

Moreover, according to a fourth aspect of the present invention, in addition to the third aspect, the lower member comprises a first extending portion that extends into an interior of the torsion beam part of the upper member and is welded to inner faces of the front and rear side wall portions, and the first extending portion is inclined upward so as to be closer to the bottom wall portion toward the vehicle body center line.

Further, according to a fifth aspect of the present invention, in addition to the fourth aspect, the lower member comprises a pair of front and rear second extending portions that extend toward the torsion beam part of the upper member and are connected to open ends of the front and rear side wall portions so as to straddle the weld part, the first extending portion is welded to the inner faces of the front and rear side wall portions via a first weld line, the second extending portions are welded to open ends of the front and rear side wall portions via a second weld line, and when viewed in the vehicle body vertical direction the first weld line and the second weld line overlap in the vehicle body lateral direction.

Furthermore, according to a sixth aspect of the present invention, in addition to any one of the first to fifth aspects, the trailing arm part in the vicinity of the weld part comprises a flat part, a front side wall portion formed by bending an edge on the front side of the flat part, and a rear side wall portion formed by bending an edge on the rear side of the flat part, and an angle formed, relative to the front side wall portion, by a flexural line of the trailing arm part when a load in the vertical direction is inputted and an angle formed relative to the rear side wall portion are set to be substantially equal.

Moreover, according to a seventh aspect of the present invention, in addition to the sixth aspect, the trailing arm part comprises a higher flat part connected to the flat part from above via a step part extending in substantially the vehicle body fore-and-aft direction, and the flexural line is formed along the flat part and along the step part.

Further, according to an eighth aspect of the present invention, in addition to the seventh aspect, the trailing arm part comprises a lower flat part connected to the higher flat part and the flat part from below via the rear side wall portion, a spring seat supporting a lower end of a suspension spring is provided on the front side of the lower flat part, a damper support portion supporting a lower end of a damper is provided on the rear side of the lower flat part, and a bulge portion that bulges toward the inside in the lateral direction is formed on the higher flat part facing the outside in the lateral direction of the spring seat.

It should be noted here that first and second blank materials 13a and 13b of an embodiment correspond to the blank material of the present invention, a front side wall portion 32 and a rear side wall portion 33 of the embodiment correspond to the side wall portion of the present invention, and a front flange 34 and a rear flange 35 of the embodiment correspond to the flange of the present invention.

Effects of the Invention

In accordance with the first aspect of the present invention, the trailing arm part and the torsion beam part of the torsion beam type suspension device are formed as a unit by press-forming a tailored blank material in which end parts of plate materials having different thicknesses are butt-welded via a weld part. Since the weld part of the tailored blank material has a U-shaped cross section in which front and rear side wall portions extending in a substantially vertical direction are connected via a bottom wall portion, and the pair of cutouts are formed in the edge of at least one of the side wall portions at positions sandwiching the weld part, when the left and right trailing arm parts move vertically out of phase with each other and the torsion beam part is twistedly deformed, shifting the concentration of stress from the weld part to the cutout enables peeling apart of the weld end part to be prevented and the durability of the torsion beam type suspension device to be enhanced.

Furthermore, in accordance with the second aspect of the present invention, since there is provided the flange extending from the lower end of at least one of the side wall portions in the vehicle body fore-and-aft direction and the pair of cutouts are formed in the flange, the concentration of stress on the cutout can be alleviated by the flange, thereby increasing the strength of the area around the weld part and enhancing the durability.

Moreover, in accordance with the third aspect of the present invention, since there are provided the upper member forming the trailing arm part and the torsion beam part and the lower member welded to the lower face of the trailing arm part of the upper member to form a closed cross section, and the inner end in the vehicle width direction of the lower member extends to the positions of the pair of cutouts, it is possible to enhance the rigidity of the trailing arm part and the torsion beam part of the upper member by means of the lower member.

Furthermore, in accordance with the fourth aspect of the present invention, if the left and right trailing arms move vertically out of phase with each other together with left and right wheels, a torsion beam formed with a U-shaped cross section having a bottom wall portion and front and rear side wall portions would twistedly deform, and the lower face open section would open and close to thus easily make the twist rigidity unstable. However, since when the lower member forming the lower half of the trailing arm is welded to the lower face of the upper member forming the upper half of the trailing arm and the torsion beam, the lower member has the first extending portion that extends into the interior of the torsion beam and is welded to inner faces of the front and rear side wall portions, and the first extending portion is inclined upward so as to be closer to the bottom wall portion toward the vehicle body center line, it is possible to reinforce the lower face open section of left and right opposite ends of the torsion beam by means of the lower member so as to stabilize the twist rigidity, thereby preventing the vehicle drivability from being badly affected.

Moreover, in accordance with the fifth aspect of the present invention, since the upper member is formed as a unit by press-forming the tailored blank material in which end parts of blank materials having different thicknesses are butt-welded via the weld part, when the torsion beam twistedly deforms there is a possibility that a weld end part would peel apart; however, since the lower member includes the pair of front and rear second extending portions extending toward the torsion beam and connected to the open ends of the front and rear side wall portions so as to straddle the weld part, it is possible to reinforce the weld part of the tailored blank material by means of the second extending portions, thereby preventing peeling apart from occurring. Moreover, since the first weld line for welding the first extending portion to inner faces of the front and rear side wall portions and the second weld line for welding the second extending portions to the open ends of the front and rear side wall portions overlap in the vehicle body lateral direction when viewed in the vehicle body vertical direction, even if the first and second weld lines are discontinuous, the rigidity does not change rapidly, thus preventing the weld end part from peeling apart.

Furthermore, in accordance with the sixth aspect of the present invention, since the trailing arm part in the vicinity of the weld part of the tailored blank material includes the flat part, the front side wall portion formed by bending the edge on the front side of the flat part, and the rear side wall portion formed by bending the edge on the rear side of the flat part, when a load in the vertical direction is inputted to the trailing arm part, the amount of displacement in the fore-and-aft direction of the side wall portion changes according to the angle formed by the flexural line of the trailing arm part relative to the side wall portion, and it becomes easy to peel apart the weld end part on the side in which the amount of displacement in the fore-and-aft direction is large; however, setting the angle formed by the flexural line of the trailing arm part relative to the front side wall portion and the angle formed relative to the rear side wall portion to be substantially equal can eliminate any difference in the amount of displacement in the fore-and-aft direction between the front and rear side wall portions, thus equalizing the difference in stress between the front and rear weld end parts and thereby enhancing the durability.

Moreover, in accordance with the seventh aspect of the present invention, since the trailing arm part includes the higher flat part connected to the flat part from above via the step part extending in substantially the vehicle body fore-and-aft direction, and the flexural line is formed along the flat part extending along the step part, it is possible to freely set the direction of the flexural line by means of the layout of the step part and the higher flat part.

Furthermore, in accordance with the eighth aspect of the present invention, since the trailing arm part includes the lower flat part connected to the higher flat part and the flat part from below via the rear side wall portion, the spring seat supporting the lower end of the suspension spring is provided on the front side of the lower flat part, the damper support portion supporting the lower end of the damper is provided on the rear side of the lower flat part, and the bulge portion bulging toward the inside in the lateral direction is formed on the higher flat part facing the outside in the lateral direction of the spring seat, in a case in which the vehicle drives over a bump, etc. on the road surface, if an upward load is inputted from a wheel, the region for supporting the force of bending the trailing arm part is increased by means of the bulge portion, thus preventing the concentration of stress and suppressing deformation of the trailing arm part.

EXPLANATION OF REFERENCE NUMERALS AND SYMBOLS

Figure 1:
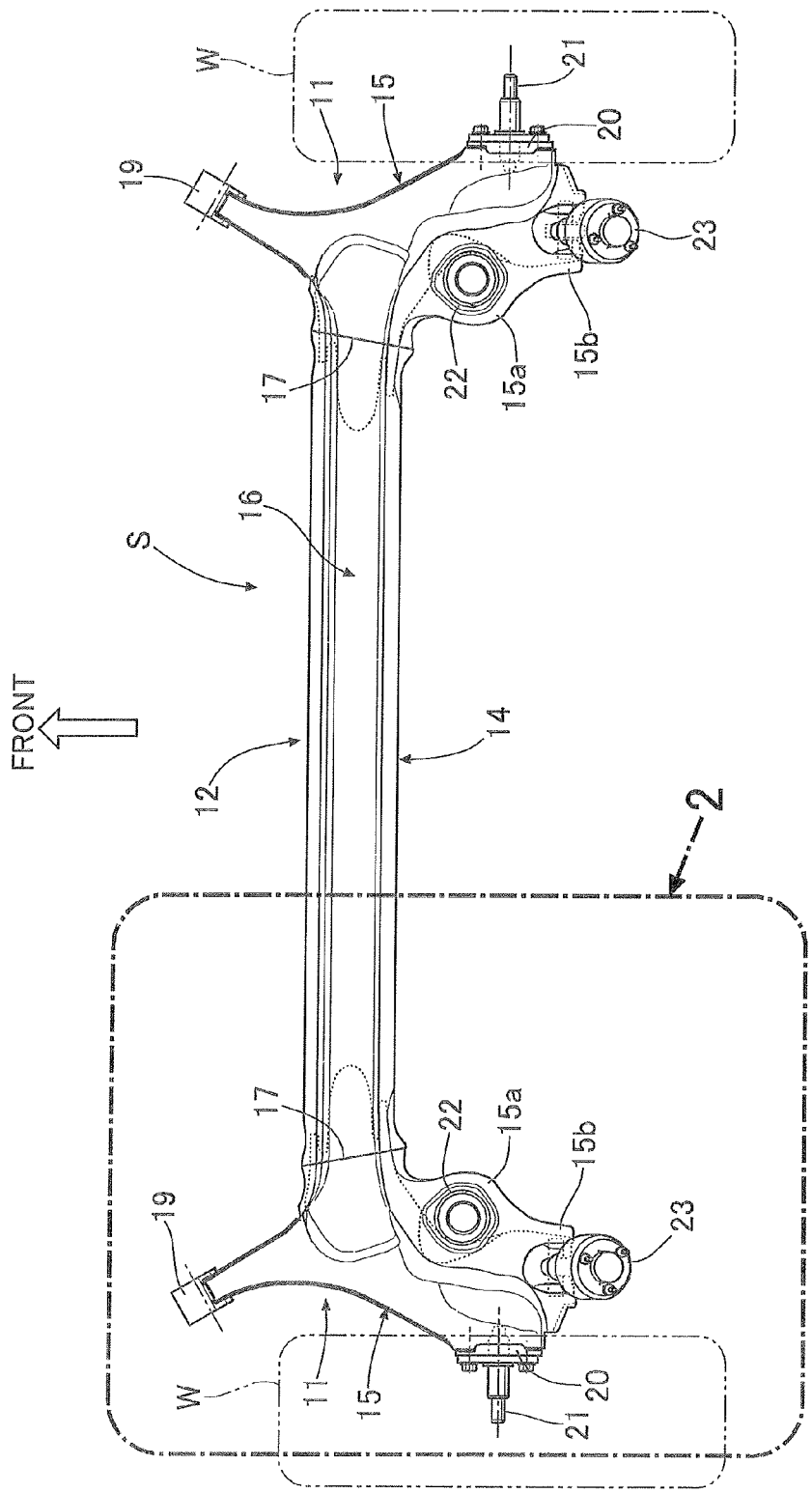
FIG. 1 is an overall plan view of a torsion beam type suspension device. (first embodiment)

13 Tailored blank material
14 Torsion beam part
15 Trailing arm part
15a Spring seat
15b Damper support portion
16 Upper member
17 Weld part
18 Lower member
18b First extending portion
18c Second extending portion
18d Second extending portion
22 Suspension spring
23 Damper
31 Bottom wall portion
32 Front side wall portion (side wall portion)
33 Rear side wall portion (side wall portion)
34 Front flange (flange)
34a Cutout
34b Cutout
35 Rear flange (flange)
35c Cutout
35d Cutout
36 Higher flat part
36a Bulge portion
37 Step part
38 Flat part
39 Lower flat part
W Wheel
w1 First weld line
w2 Second weld line
C1 Flexural line of trailing arm part
γ Angle
δ Angle Modes for Carrying out the Invention An embodiment of the present invention is explained below by reference to FIG. 1 to FIG. 10.

Embodiment 1

As shown in FIG. 1, a vehicular torsion beam type suspension device S is formed into an overall H shape while including a pair of left and right trailing arms 11 and 11 extending in substantially the vehicle body fore-and-aft direction and a torsion beam 12 extending in the vehicle body lateral direction and connecting intermediate sections in the fore-and-aft direction of the two trailing arms 11 and 11.

Upper halves of the left and right trailing arms 11 and 11 and the torsion beam 12 are formed from a tailored blank material 13 (see FIG. 7) that is formed as a unit in advance. The tailored blank material 13 is formed by butt-welding second blanks 13b and 13b having a small plate thickness to opposite sides of a first blank 13a having a large plate thickness, and press-forming the tailored blank material 13 enables an upper member 16 to be obtained, the upper member 16 integrally having a torsion beam part 14 that is formed from the first blank 13a and left and right trailing arm parts 15 and 15 that are formed from the second blanks 13b and 13b. Employment of such a tailored blank material 13 enables optimum strength distribution and weight distribution to be realized by varying the plate thickness of each part of one pressed product and the processing cost of press-forming or welding to be reduced.

When the upper member 16 press-formed from the tailored blank material 13 is viewed from above, weld parts 17 and 17 of the torsion beam part 14 and the trailing arm parts 15 and 15 extend in substantially the vehicle body fore-and-aft direction along the border between the torsion beam 12 and the trailing arms 11 and 11. Welding left and right lower members 18 and 18 (see FIG. 3 and FIG. 4) to lower faces of the trailing arm parts 15 and 15 and lower faces of left and right opposite end parts of the torsion beam part 14 of the upper member 16 forms the trailing arms 11 and 11 into a substantially closed cross section.

A tubular joint holder 19 is welded to an extremity of the trailing arm 11, and this joint holder 19 is pivotably supported on the vehicle body via a rubber bush joint. Furthermore, an axle holder 20 is welded to the outer end in the lateral direction in a rear part of the trailing arm 11, and a wheel W is rotatably supported on the axle holder 20 via an axle 21. Moreover, a spring seat 15a is formed at the inner end in the lateral direction in the rear part of the trailing arm 11, and the lower end of a suspension spring 22 is supported on the spring seat 15a. Furthermore, a damper support portion 15b is formed at the rear end of the trailing arm 11, and the lower end of a damper 23 is supported on the damper support portion 15b.

As shown in FIG. 3 to FIG. 8, among the torsion beam part 14 press-formed from the thick first blank 13a of the tailored blank material 13 and the trailing arm part 15 press-formed from the thin second blank 13b of the tailored blank material 13, the entirety of the torsion beam part 14 and part of the trailing arm part 15 connected to the torsion beam part 14 with the weld part 17 sandwiched therebetween are formed into a downwardly opening overall reverse U-shaped cross section while including a bottom wall portion 31 positioned on the upper side, a front side wall portion 32 extending downwardly from the front end of the bottom wall portion 31, a rear side wall portion 33 extending downwardly from the rear end of the bottom wall portion 31, a front flange 34 extending forward from the lower end of the front side wall portion 32, and a rear flange 35 extending rearward from the lower end of the rear side wall portion 33.

A pair of cutouts 34a and 34b are formed at positions on opposite sides, sandwiching the weld part 17, of the front flange 34, the cutouts 34a and 34b being smoothly recessed so that the width in the fore-and-aft direction of the front flange 34 decreases slightly, and a pair of cutouts 35c and 35d are formed at positions on opposite sides, sandwiching the weld part 17, of the rear flange 35, the cutouts 35c and 35d being smoothly recessed so that the width in the fore-and-aft direction of the rear flange 35 decreases slightly.

Figure 2:
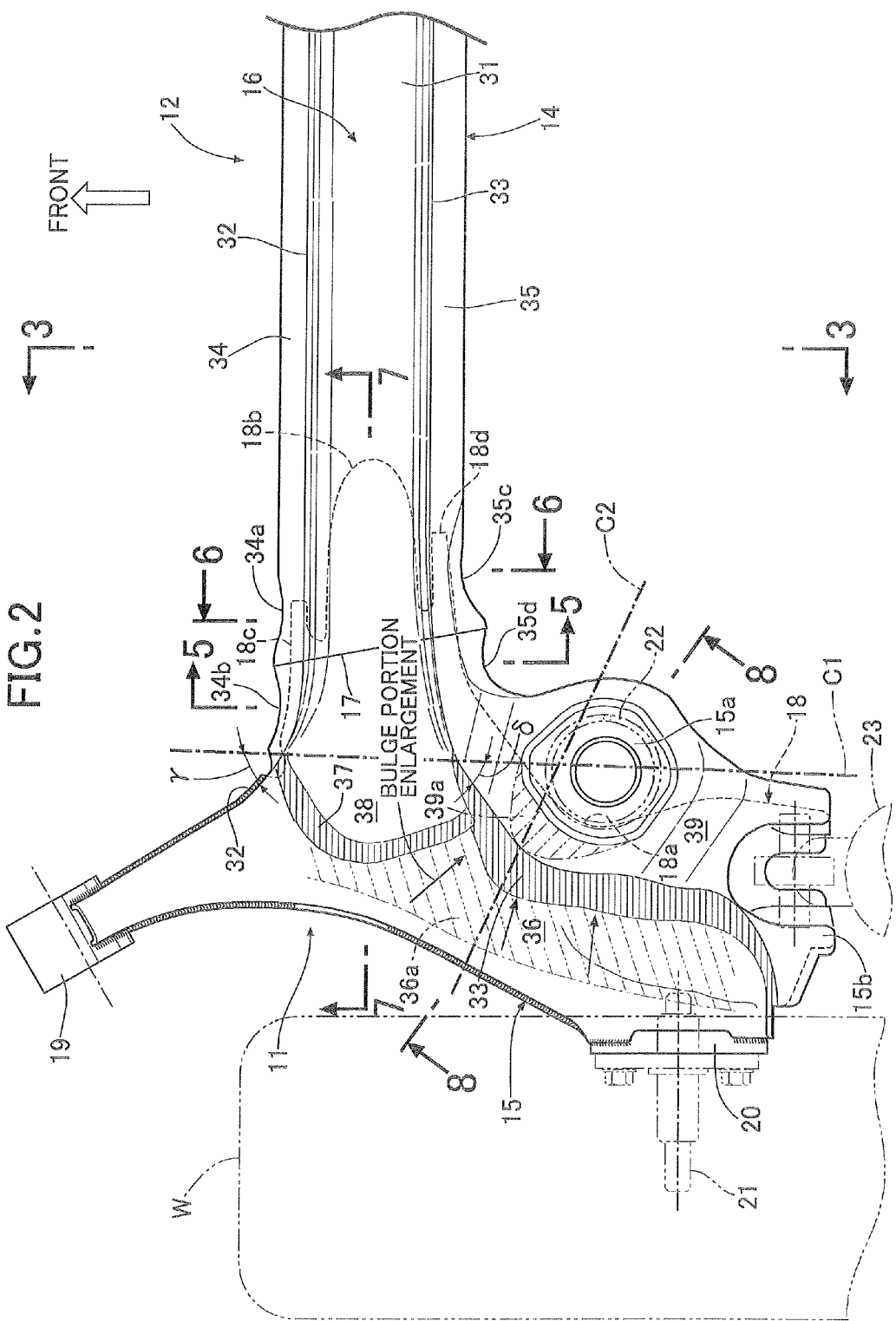
FIG. 2 is an enlarged view of part 2 of FIG. 1. (first embodiment)
Figure 3:
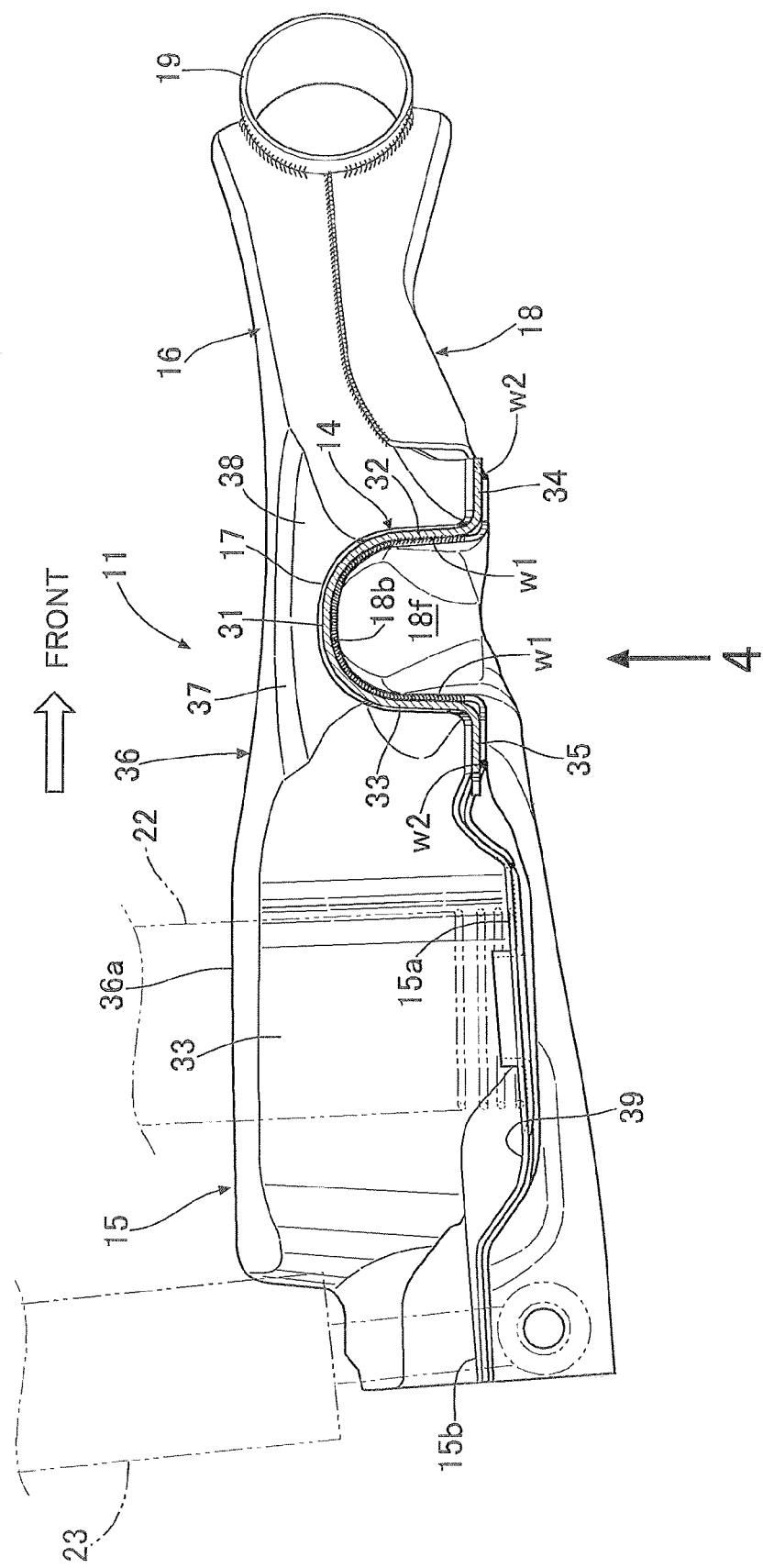
FIG. 3 is a sectional view along line 3-3 in FIG. 2. (first embodiment)

As most clearly shown in FIG. 2, an upper wall of the trailing arm part 15 of the upper member 16 includes a flat part 38 connected to the bottom wall portion 31 of the torsion beam part 14 at substantially the same height, and a higher flat part 36 connected to the outside in the lateral direction of the flat part 38 via a step part 37 and being higher than the flat part 38, the step part 37 extending in substantially the vehicle body fore-and-aft direction. That is, the higher flat part 36 extends in the fore-and-aft direction along the outer end in the lateral direction of the trailing arm part 15, the joint holder 19 connected to the vehicle body is provided at the front end of the higher flat part 36, and the axle holder 20 supporting the axle 21 is provided at the rear end thereof.

Furthermore, a lower flat part 39 is formed in a portion to the rear of the flat part 38 and the higher flat part 36, the lower flat part 39 being stepped down via the curved rear side wall portion 33 extending continuously from the torsion beam part 14. The lower flat part 39 is connected to the rear flange 35 of the torsion beam part 14 at substantially the same height, and the spring seat 15a and the damper support portion 15b are provided thereon. A flexural line C1 shown by a single-dotted chain line in FIG. 2 is the center line of bending deformation of the trailing arm 11 when a load is inputted into the spring seat 15a and the damper support portion 15b of the trailing arm 11, the joint holder 19, and the axle holder 20, that is, the center line around which the trailing arm part 15 bendingly deforms at the flexural line C1, and the step part 37 is disposed at a position so as not to intersect the flexural line C1.

Figure 10:
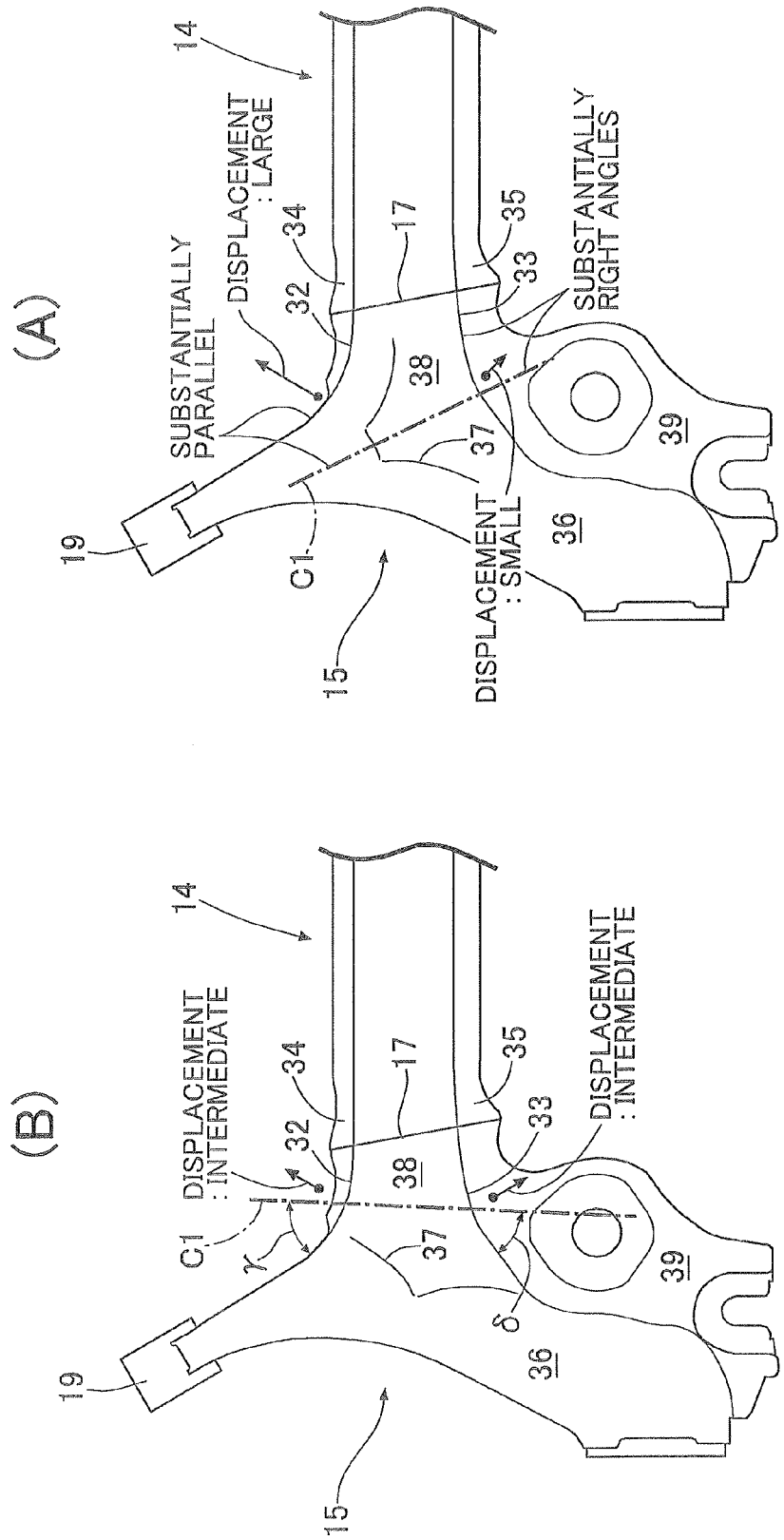
FIG. 10 is a diagram for explaining the operation of a step part. (first embodiment)

An angle γ (see FIG. 2 and FIG. 10 (B)) at which the flexural line C1 of the trailing arm part 15 intersects the front side wall 32 and an angle δ (see FIG. 2 and FIG. 10 (B)) at which the flexural line C1 intersects the rear side wall portion 33 are set so as to be substantially equal.

Figure 8:
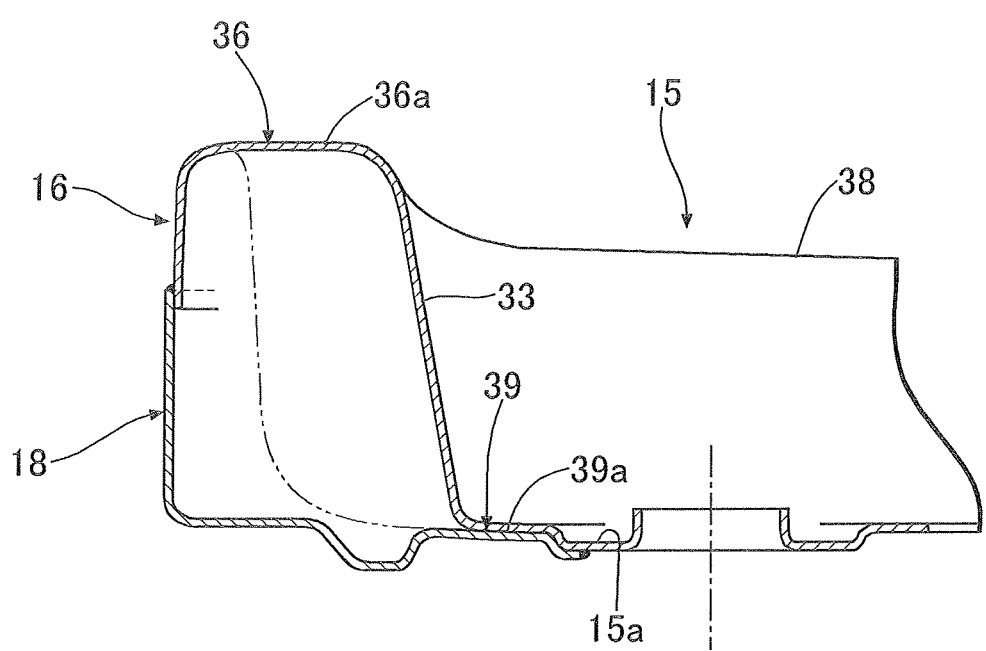
FIG. 8 is a sectional view along line 8-8 in FIG. 2. (first embodiment)

In FIG. 2 and FIG. 8, the inner edge in the vehicle width direction of a conventional higher flat part 36 is shown by a chain line. The inner edge in the vehicle width direction of the higher flat part 36 of the present embodiment protrudes inward in the vehicle width direction relative to the conventional inner edge shown by the chain line, and the higher flat part 36 spreads inward in the vehicle width direction by the corresponding amount, thus forming a bulge portion 36a. Providing this bulge portion 36a allows a flexural line C2 (see FIG. 2) that is different from the flexural line C1 to be formed in the trailing arm part 15. The other flexural line C2 extends in substantially the vehicle body lateral direction while passing through the bulge portion 36a and the vicinity of the spring seat 15a.

Furthermore, as shown in FIG. 2 and FIG. 8, an upper face of the lower member 18 and a lower face of the lower flat part 39 sandwiched between the spring seat 15a and rear side wall portion 33 are superimposed via a superimposed portion 39a. The area of the superimposed portion 39a is shown by hatching in FIG. 2. If the section modulus of the superimposed portion 39a is high, concentration of stress easily occurs in another section, but deliberately lowering the section modulus of the superimposed portion 39a enables the concentration of stress on a part where the lower panel 18 and the trailing arm part 15 are joined to be avoided.

Figure 4:
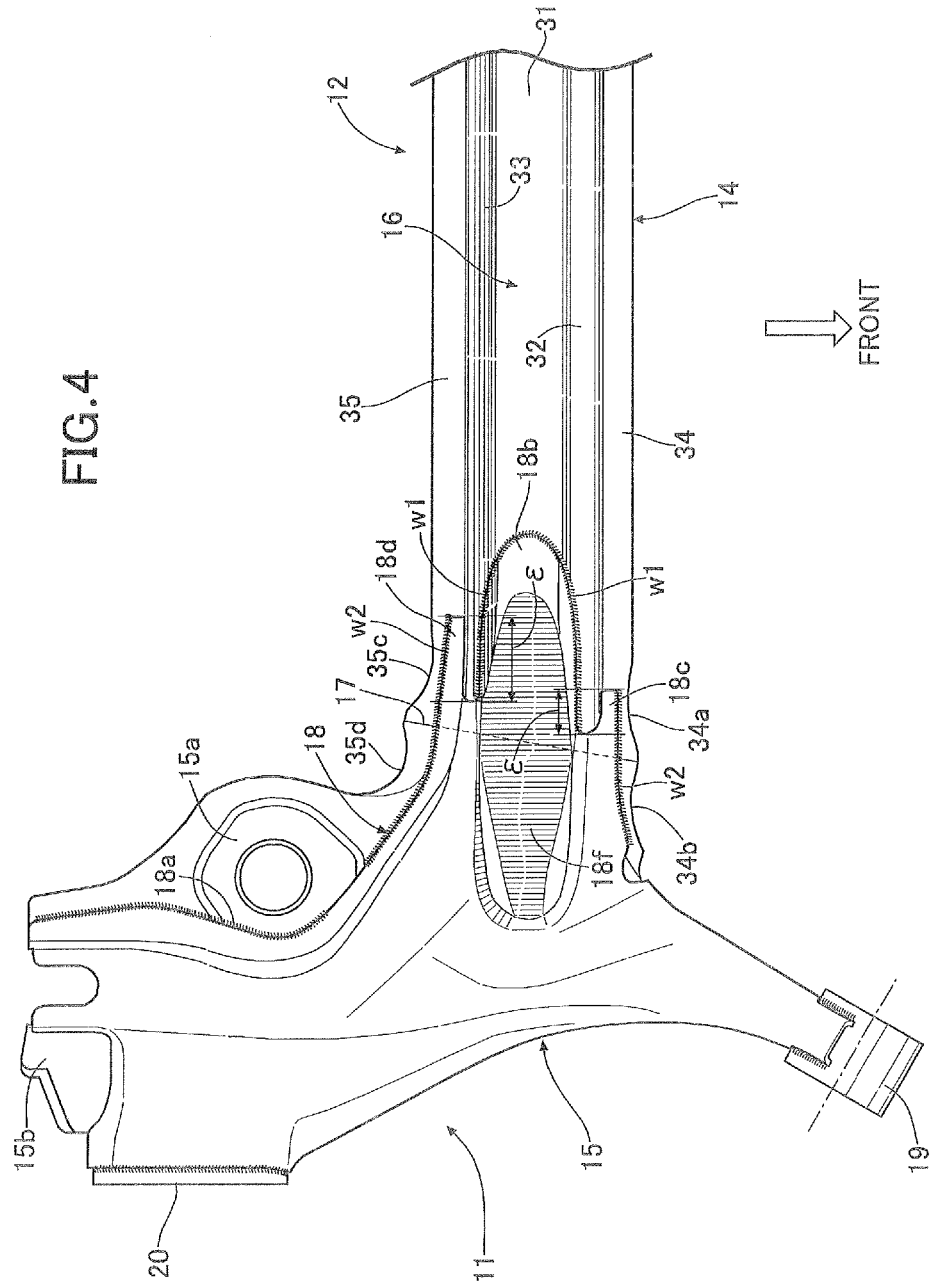
FIG. 4 is a view from the direction of arrow 4 in FIG. 3. (first embodiment)
Figure 5:
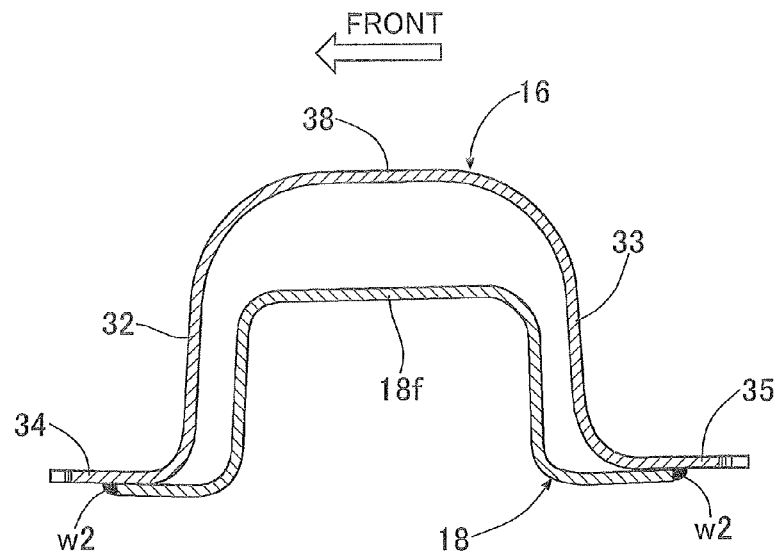
FIG. 5 is a sectional view along line 5-5 in FIG. 2. (first embodiment)
Figure 6:
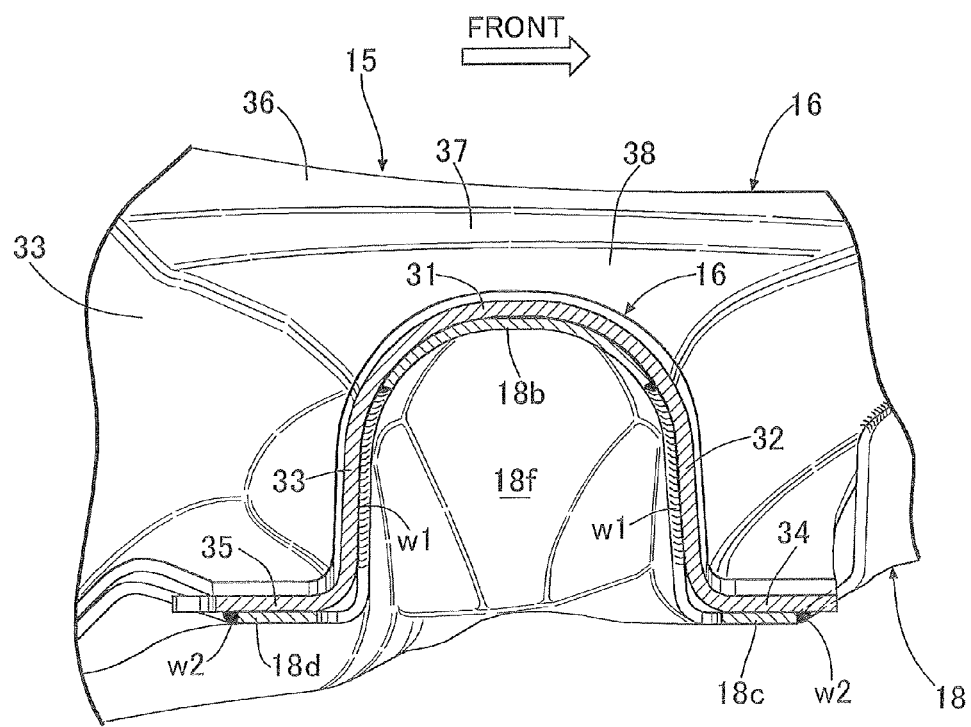
FIG. 6 is a sectional view along line 6-6 in FIG. 2. (first embodiment)
Figure 7:
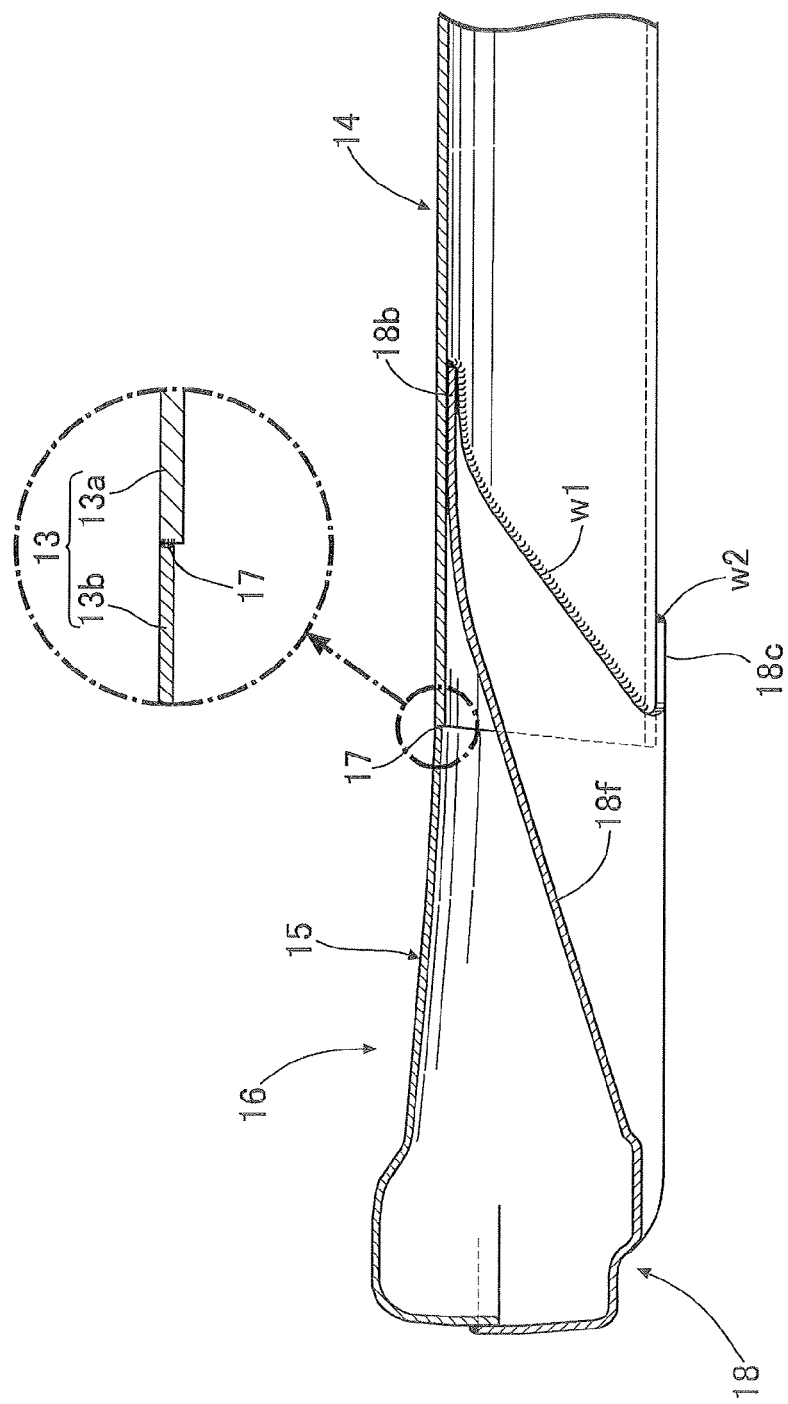
FIG. 7 is a sectional view along line 7-7 in FIG. 2. (first embodiment)

As most clearly shown in FIG. 4, the lower member 18 welded to a lower face of the upper member 16 has an outline that is substantially the same as the outline of the trailing arm part 15 of the upper member 16. A cutout 18a is formed in a portion, corresponding to the spring seat 15a, of the upper member 16, and a first extending portion 18b extending beyond the weld part 17 to a lower face of the torsion beam part 14 and a pair of second extending portions 18c and 18d positioned in front thereof and to the rear thereof are also formed.

The peripheral edge of the first extending portion 18b of the lower member 18, which extends into the interior of the torsion beam part 14 in a shape of tongue, is welded to inner faces of the bottom wall portion 31, the rear side wall portion 32 and the front side wall portion 33 of the torsion beam part 14 via a weld line w1. On the other hand, the second extending portions 18c and 18d of the lower member 18 are welded along lower ends of the front and rear side wall portion 32 and 33 of the torsion beam part 14 via weld lines w2 and w2. The weld lines w2 and w2 are at low positions relative to the weld line w1, and in order to prevent concentration of stress, the inner ends in the lateral direction of the weld line w1 and the outer ends in the lateral direction of the weld lines w2 and w2 are discontinuous and are not connected. However, when viewed in the vertical direction, the inner ends in the lateral direction of the weld line w1 and the outer ends in the lateral direction of the weld lines w2 and w2 overlap only by a distance ε (see FIG. 4) in the lateral direction.

The operation of the embodiment of the present invention having the above-mentioned arrangement is now explained.

When the vehicle is turning, traveling on a road in poor condition, etc., if the left and right trailing arms 11 and 11 move vertically out of phase with each other and the torsion beam 12 is twistedly deformed, stress is concentrated on a weld end part of the weld part 17 of the tailored blank material 13 and peeling apart would easily occur; however, since the pairs of cutouts 34a and 34b; 35c and 35d are formed at positions sandwiching the weld part 17 at the edges of the front flange 34 and the rear flange 35, the concentration of stress is shifted from the weld part 17 to the cutouts 34a and 34b; 35c and 35d to thus prevent peeling apart of the weld end part, and the concentration of stress on the cutouts 34a and 34b; 35c and 35d is also alleviated by means of the front flange 34 and the rear flange 35 to thus prevent cracking in the cutout, thus making it possible to increase the strength of the area around the weld part 17 and thereby further enhancing the durability.

Figure 9:
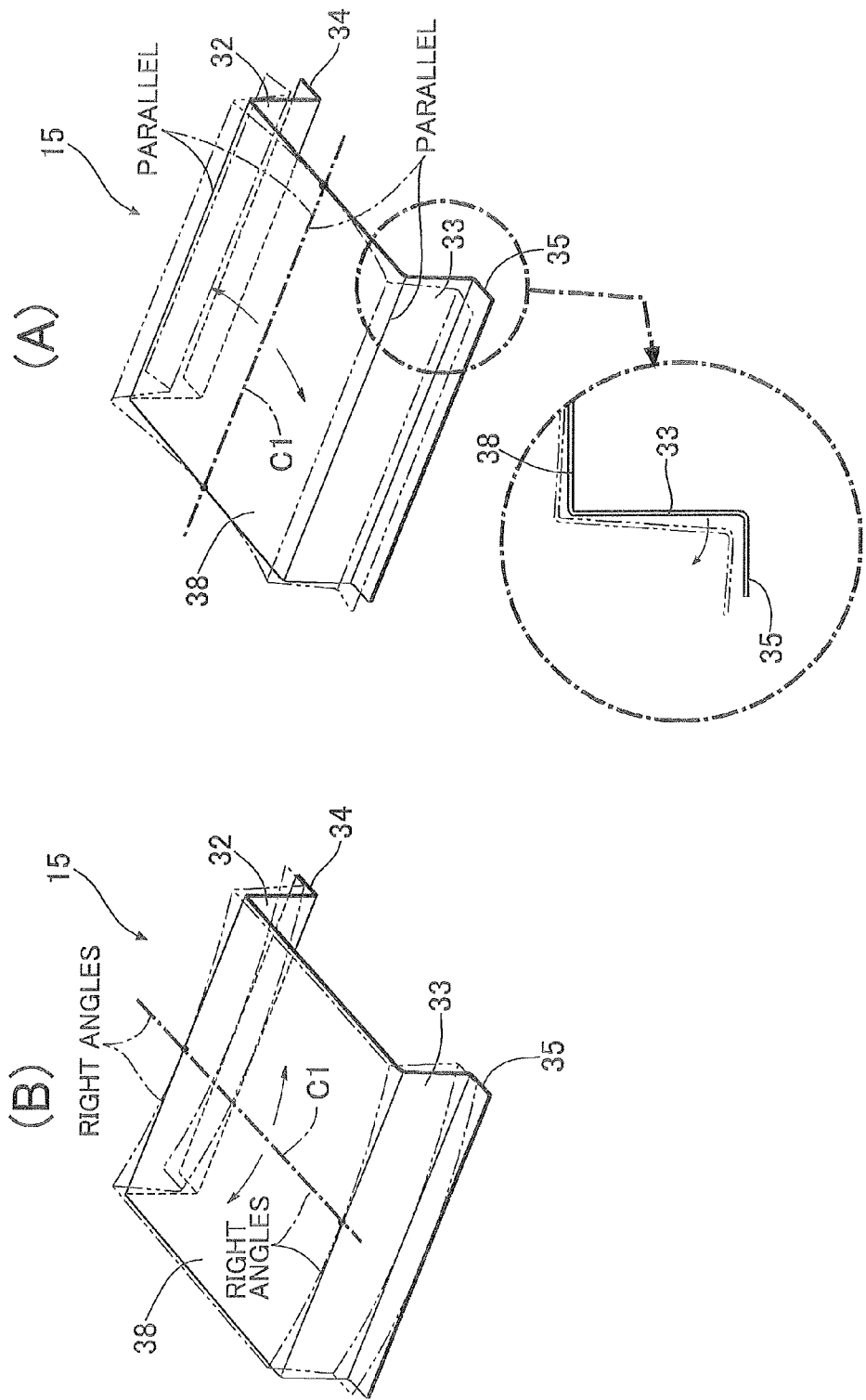
FIG. 9 is a diagram showing a member that is a model of a trailing arm part. (first embodiment)

FIG. 9 is a model of the trailing arm part 15 of the upper member 16. The trailing arm part 15 includes the flat part 38, the front side wall portion 32, and the rear side wall portion 33; whereas in FIG. 9 (A) the flexural line C1 is disposed in parallel to the front and rear side wall portions 32 and 33, in FIG. 9 (B) the flexural line C1 is disposed at right angles to the front and rear side wall portion 32 and 33.

As shown by a chain line in FIG. 9 (A), when the trailing arm part 15 is bendingly deformed around the flexural line C1, the front and rear flanges 34 and 35 at the lower ends of the front and rear side wall portions 32 and 33 are greatly displaced in the horizontal direction. On the other hand, as shown by a chain line in FIG. 9 (B), when the trailing arm part 15 is bendingly deformed around the flexural line C1, the front and rear flange 34 and 35 are hardly displaced in the horizontal direction. That is, if the flexural line C1 is disposed at an angle closer to right angles relative to the front and rear side wall portions 32 and 33, displacement in the horizontal direction of the front and rear flanges 34 and 35 can be made smaller, whereas if the flexural line C1 is disposed at an angle closer to parallel relative to the front and rear side wall portions 32 and 33, displacement in the horizontal direction of the front and rear flange 34 and 35 increases.

FIG. 10 (A) shows a conventional example; since a step part 37 of a trailing arm part 15 of an upper member 16 is formed so as to straddle a flexural line C1, a rear side wall portion 33 is substantially perpendicular to the flexural line C1, and the amount of displacement in the horizontal direction of a rear flange 35 becomes small. On the other hand, a front side wall portion 32 is close to parallel to the flexural line C1, and the amount of displacement in the horizontal direction of a front flange 34 increases.

FIG. 10 (B) shows the present embodiment; since the step part 37 of the trailing arm part 15 of the upper member 16 is formed so as not to straddle the flexural line C1, both the front and rear side wall portions 32 and 33 intersect the flexural line C1 at substantially equal angles γ and δ, and the amounts of displacement in the horizontal direction of the front and rear flanges 34 and 35 are uniform and at an intermediate level. As a result, the concentration of stress onto a weld end part on the front side of the weld part 17 and a weld end part on the rear side thereof can be equalized and stress on the weld end part on the front side thereof, where stress is particularly highly concentrated in the conventional arrangement, can be reduced, thus preventing effectively the occurrence of peeling apart.

Furthermore, since the trailing arm part 15 includes the lower flat part 39 connected to the higher flat part 36 and the flat part 38 from below via the rear side wall portion 33, the spring seat 15a supporting the lower end of the suspension spring 22 is provided on the front side of the lower flat part 39, the damper support portion 15b supporting the lower end of the damper 23 is provided on the rear side of the lower flat part, and the bulge portion 36a bulging toward the inside in the vehicle width direction is formed on the higher flat part 36 facing the outside in the lateral direction of the spring seat 15a, the flexural line C2 extending in substantially the vehicle body lateral direction (see FIG. 2) is formed on the trailing arm part 15.

In a case in which the vehicle drives over a bump, etc. on a road surface, if an upward load is inputted from the wheel W, the trailing arm part 15 attempts to bend around the center of rotation extending in the vehicle body fore-and-aft direction through the joint holder 19 and the damper support portion 15b, but the region for supporting the force of bending the trailing arm part 15 is increased by means of the bulge portion 36a, thus making the concentration of stress difficult and, moreover, since the flexural line C2 extends in substantially the vehicle body lateral direction, it is possible to suppress deformation of the trailing arm 15 around the flexural line C2 caused by a load from the road surface.

Furthermore, when a torsion beam part 14 formed into a U-shaped cross section having a bottom wall portion 31, a front side wall portion 32, and a rear side wall portion 33 twistedly deforms, a lower face open section opens and closes thus easily making the twist rigidity unstable. However, since when the lower member 18 forming the lower half of the trailing arm 11 is welded to the lower face of the upper member 16 forming the upper half of the trailing arm 11 and the torsion beam 12, the lower member 18 has the first extending portion 18b that extends into the interior of the torsion beam 12 and is welded to inner faces of the front and rear side wall portions 32 and 33, and the first extending portion 18b is inclined upward so as to be closer to the bottom wall portion 31 toward the vehicle body center line, it is possible to reinforce the lower face open section of the left and right opposite ends of the torsion beam 12 by means of the lower member 18 so as to stabilize the twist rigidity, thereby preventing the vehicle drivability from being badly affected.

Since the upper member 16 is formed as a unit by press-forming the tailored blank material 13 formed by butt-welding end parts of the first and second blanks 13a, 13b, and 13b having different thicknesses via the weld part 17, when the torsion beam part 14 twistedly deforms there is a possibility that the weld end parts of the weld part 17 would peel apart; however, since the lower member 18 includes the pair of front and rear second extending portions 18c and 18d connected to the open ends of the front and rear side wall portions 32 and 33 so as to straddle the weld part 17, it is possible to reinforce the weld part 17 by means of the second extending portions 18c and 18d, thereby preventing peeling apart from occurring.

Moreover, since the first weld line w1 for welding the first extending portion 18b to inner faces of the front and rear side wall portions 32 and 33 and the second weld lines w2 and w2 for welding the second extending portions 18c and 18d to the open ends of the front and rear side wall portions 32 and 33 overlap in the vehicle body lateral direction when viewed in the vertical direction, even if the first and second weld lines w1; w2 and w2 are discontinuous, the rigidity does not change rapidly, thus preventing more effectively the weld end part 17 from peeling apart.

An embodiment of the present invention is explained above, but the present invention may be modified in a variety of ways as long as the modifications do not depart from the spirit and scope thereof.

For example, in the embodiment the cutouts 34a and 34b; 35c and 35d are provided in both the front flange 34 and the rear flange 35, but they may be provided only in the front flange 34 or may be provided only in the rear flange 35.

Furthermore, in the embodiment the torsion beam part 14 and the trailing arm parts 15 and 15 are press-formed from the tailored blank material 13, but they may be press-formed from a usual blank material other than the tailored blank material 13.

Moreover, it is not necessary for the angle γ formed by the flexural line C1 of the trailing arm part 15 relative to the front side wall portion 32 and the angle δ relative to the rear side wall portion 33 to strictly coincide with each other, and they may be set so as to be substantially equal.

The invention claimed is:

1. A torsion beam type suspension device comprising left and right trailing arm parts (15) that extend in a fore-and-aft direction of a vehicle body, have front ends thereof vertically swingably pivoted on the vehicle body, and axially and rotatably support a wheel (W) at a rear end thereof, and a torsion beam part (14) that extends in a lateral direction of the vehicle body and has opposite ends thereof connected to the left and right trailing arm parts (15), the trailing arm parts (15) and the torsion beam part (14) being formed as a unit by press-forming a tailored blank material (13) in which end parts of plate materials having different thicknesses are butt-welded via a weld part (17), characterized in that the torsion beam part (14) comprises a U-shaped cross section in which front and rear side wall portions (32,33) are connected via a bottom wall portion (31), the device comprises an upper member (16) that forms the trailing arm part (15) and the torsion beam part (14) and a lower member (18) that is welded to the upper member (16) to form a closed cross section straddling the weld part (17), and the lower member comprises a first extending portion (18*b*) that extends into an interior of the torsion beam part (14) and is welded to inner faces of the front and rear side wall portions (32, 33), and the first extending portion (18*b*) is inclined upward so as to be closer to the bottom wall portion (31) toward the vehicle body center line.

2. The torsion beam type suspension device according to claim 1, wherein a pair of cutouts (34*a*, 34*b*; 35*c*, 35*d*) are formed at the edge of at least one of the side wall portions (32, 33) at positions sandwiching the weld part (17).

3. The torsion beam type suspension device according to claim 2, wherein the device comprises a flange (34,35) that extends from a lower end of at least said one of the side wall portions (32, 33) in the vehicle body fore-and-aft direction, and the pair of cutouts (34*a*, 34*b*; 35*c*, 35*d*) are formed in the flange (34, 35).

4. The torsion beam type suspension device according to claim 2, wherein the lower member (18) forms a closed cross section having an inner end which extends to the positions of the pair of cutouts (34*a*, 34*b*; 35*c*, 35*d*).

5. The torsion beam type suspension device according to claim 1, wherein the lower member (18) comprises a pair of front and rear second extending portions (18*c*, 18*d*) that extend toward the torsion beam part (14) of the upper member (16) and are connected to open ends of the front and rear side wall portions (32, 33) so as to straddle the weld part (17), the first extending portion (18*b*) is welded to the inner faces of the front and rear side wall portions (32, 33) via a first weld line (w1), the second extending portions (18*c*, 18*d*) are welded to open ends of the front and rear side wall portions (32, 33) via a second weld line (w2), and when viewed in the vehicle body vertical direction the first weld line (w1) and the second weld line (w2) overlap in the vehicle body lateral direction.

6. The torsion beam type suspension device according to claim 1, wherein the trailing arm part (15) in the vicinity of the weld part (17) comprises a flat part (38), a front side wall portion (32) formed by bending an edge on the front side of the flat part (38), and a rear side wall portion (33) formed by bending an edge on the rear side of the flat part (38), and when a load in the vertical direction is inputted, an angle ($\delta$) formed, relative to the front side wall portion (32), by a flexural line (C1) of a trailing arm (11) and an angle ($\delta$) formed relative to the rear side wall portion (33) are set to be substantially equal.

7. The torsion beam type suspension device according to claim 6, wherein the trailing arm part (15) comprises a higher flat part (36) connected to the flat part (38) from above via a step part (37) extending in substantially the vehicle body fore-and-aft direction, and the flexural line (C1) is formed along the flat part (38) and along the step part (37).

8. The torsion beam type suspension device according to claim 7, wherein the trailing arm part (15) comprises a lower flat part (39) connected to the higher flat part (36) and the flat part (38) from below via the rear side wall portion (33), a spring seat (15*a*) supporting a lower end of a suspension spring (22) is provided on the front side of the lower flat part (39), a damper support portion (15*b*) supporting a lower end of a damper (23) is provided on the rear side of the lower flat part (39), and a bulge portion (36*a*) that bulges toward the inside in the lateral direction is formed on the higher flat part (36) facing the outside in the lateral direction of the spring seat (15*a*).

* * * * *

UNITED STATES PATENT AND TRADEMARK OFFICE
CERTIFICATE OF CORRECTION

PATENT NO.      : 8,646,789 B2
APPLICATION NO. : 13/808410
DATED           : February 11, 2014
INVENTOR(S)     : Takaki Ohdo et al.

It is certified that error appears in the above-identified patent and that said Letters Patent is hereby corrected as shown below:

Title Page, Item (86)

Change "(86) PCT No.: PCT/JP2011/066409
§ 371 (c)(1),
(2), (4), Date: Apr. 3, 2012"

To    --(86) PCT No.: PCT/JP2011/066409
§ 371 (c)(1),
(2), (4), Date to Apr. 3, 2013--

Signed and Sealed this
Thirteenth Day of May, 2014

Michelle K. Lee
*Deputy Director of the United States Patent and Trademark Office*